(12) United States Patent
Solven

(10) Patent No.: US 10,095,341 B2
(45) Date of Patent: Oct. 9, 2018

(54) HYBRID FORCE MEASUREMENT

(71) Applicant: Synaptics Incorporated, San Jose, CA (US)

(72) Inventor: Derek Solven, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 22 days.

(21) Appl. No.: 15/199,777

(22) Filed: Jun. 30, 2016

(65) Prior Publication Data

US 2018/0004332 A1    Jan. 4, 2018

(51) Int. Cl.
    *G06F 3/041*      (2006.01)
    *G06F 3/044*      (2006.01)

(52) U.S. Cl.
    CPC ............ *G06F 3/0414* (2013.01); *G06F 3/044* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 7,158,122 B2 | 1/2007 | Roberts | |
| 7,681,432 B2 | 3/2010 | Hay et al. | |
| 7,784,366 B2 | 8/2010 | Daverman et al. | |
| 8,169,332 B2 | 5/2012 | Son | |
| 8,768,560 B2 | 7/2014 | Willis | |
| 9,024,907 B2 | 5/2015 | Bolender | |
| 9,057,653 B2 | 6/2015 | Schediwy et al. | |
| 2002/0158637 A1 | 10/2002 | Warmack et al. | |
| 2007/0229464 A1 | 10/2007 | Hotelling et al. | |
| 2007/0247443 A1 | 10/2007 | Philipp | |
| 2012/0086666 A1 | 4/2012 | Badaye et al. | |
| 2012/0218199 A1* | 8/2012 | Kim | G06F 3/0412 345/173 |
| 2012/0319987 A1 | 12/2012 | Woo | |
| 2012/0327025 A1 | 12/2012 | Huska et al. | |
| 2013/0073142 A1 | 3/2013 | Hergesheimer et al. | |
| 2013/0099802 A1* | 4/2013 | Hsieh | G06F 3/044 324/661 |
| 2013/0106794 A1 | 5/2013 | Logan et al. | |
| 2013/0328051 A1* | 12/2013 | Franklin | H01L 29/786 257/59 |
| 2014/0043263 A1 | 2/2014 | Park et al. | |
| 2014/0085213 A1 | 3/2014 | Huppi et al. | |
| 2014/0132553 A1 | 5/2014 | Park et al. | |
| 2014/0132563 A1 | 5/2014 | Schediwy et al. | |

(Continued)

*Primary Examiner* — Patrick Moon
(74) *Attorney, Agent, or Firm* — Ferguson Braswell Fraser Kubasta PC

(57) ABSTRACT

Hybrid force sensing includes acquiring absolute capacitance measurements of the absolute capacitance of at least one frame side electrode, acquiring mutual capacitance measurements of the mutual capacitance between the at least one frame side electrode and at least one display side electrode. Hybrid force sensing further includes determining an absolute capacitance derived force from the absolute capacitance measurements, determining a mutual capacitance derived force from the mutual capacitance measurements, and combining the absolute capacitance derived force and the mutual capacitance derived force to obtain a combined force. Hybrid force sensing further includes performing an action based on the combined force.

18 Claims, 4 Drawing Sheets

(56) References Cited

U.S. PATENT DOCUMENTS

| | | |
|---|---|---|
| 2014/0345358 A1 | 11/2014 | White et al. |
| 2014/0347314 A1 | 11/2014 | Liu et al. |
| 2015/0116608 A1 | 4/2015 | Jeong |
| 2016/0041653 A1* | 2/2016 | Schediwy ............. G06F 1/1692 345/174 |
| 2016/0224171 A1* | 8/2016 | Kim ...................... G06F 3/0488 |
| 2016/0299598 A1* | 10/2016 | Yoon ....................... G06F 3/044 |

* cited by examiner

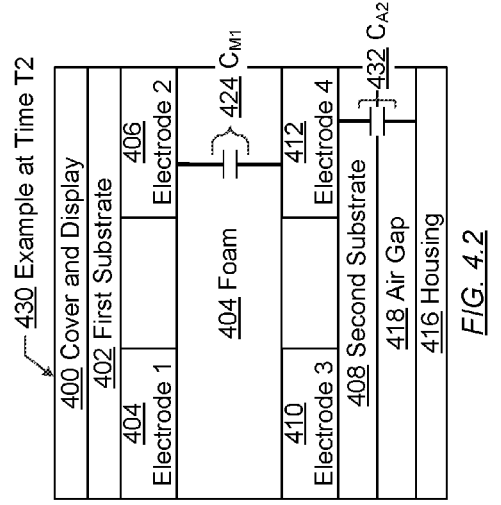
FIG. 4.1
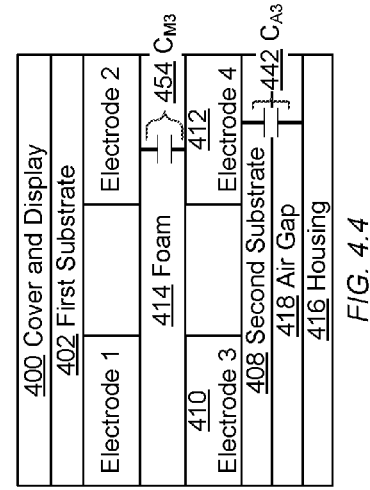
FIG. 4.2
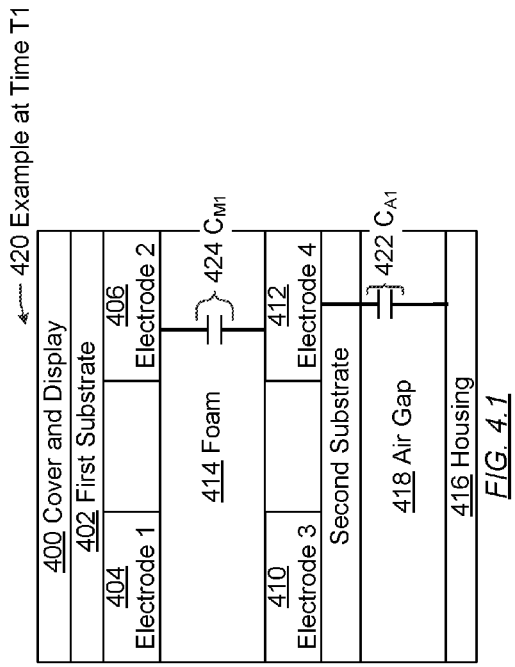
FIG. 4.3
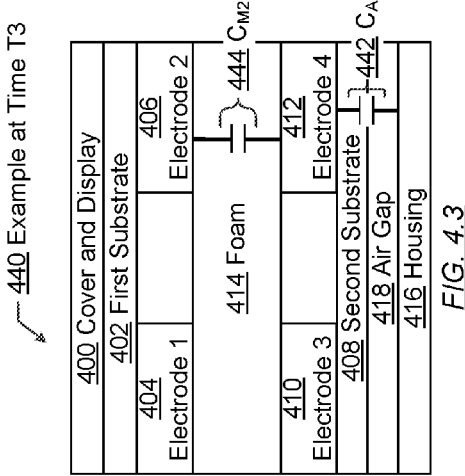
FIG. 4.4

HYBRID FORCE MEASUREMENT

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a method for hybrid force sensing including acquiring absolute capacitance measurements of the absolute capacitance of at least one frame side electrode, acquiring mutual capacitance measurements of the mutual capacitance between the at least one frame side electrode and at least one display side electrode. The method further includes determining an absolute capacitance derived force from the absolute capacitance measurements, determining a mutual capacitance derived force from the mutual capacitance measurements, and combining the absolute capacitance derived force and the mutual capacitance derived force to obtain a combined force. The method further includes performing an action based on the combined force.

In general, in one aspect, one or more embodiments relate to an input device including at least one frame side electrode, at least one display side electrode, and a processing system. The processing system is configured to acquire absolute capacitance measurements of the absolute capacitance of at least one frame side electrode, acquire mutual capacitance measurements of the mutual capacitance between the at least one frame side electrode and at least one display side electrode. The processing system is further configured to determine an absolute capacitance derived force from the absolute capacitance measurements, determine a mutual capacitance derived force from the mutual capacitance measurements, and combine the absolute capacitance derived force and the mutual capacitance derived force to obtain a combined force. The processing system is further configured to perform an action based on the combined force.

In general, in one aspect, one or more embodiments relate to a processing system for hybrid force sensing including sensor circuitry with functionality to acquire absolute capacitance measurements of the absolute capacitance of at least one frame side electrode, and acquire mutual capacitance measurements of the mutual capacitance between the at least one frame side electrode and at least one display side electrode. The processing system further includes processing circuitry with functionality to determine an absolute capacitance derived force from the absolute capacitance measurements, determine a mutual capacitance derived force from the mutual capacitance measurements, combine the absolute capacitance derived force and the mutual capacitance derived force to obtain a combined force, and perform an action based on the combined force.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and:

FIGS. 4.1, 4.2, 4.3, and 4.4 show a times series in accordance with one or more embodiments of the invention.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability.

Figure 1:
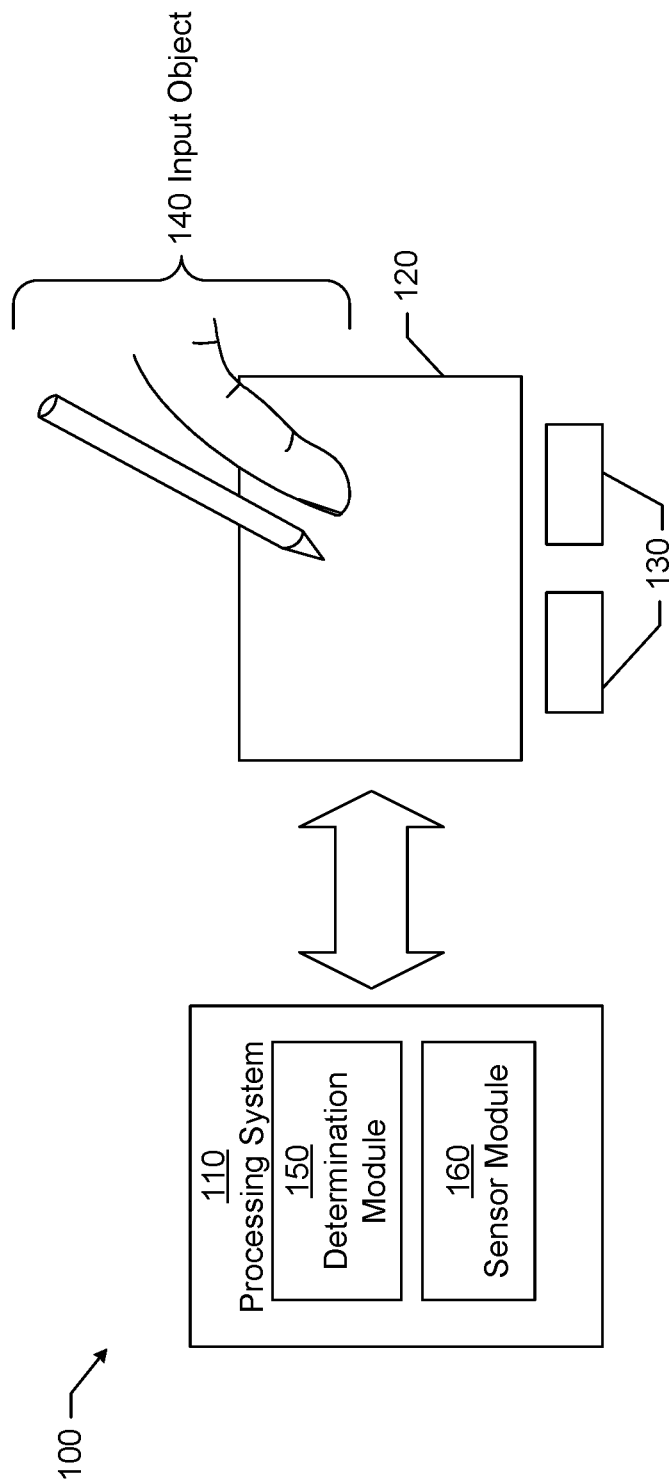
FIGS. 1 and 2 are block diagrams of example systems that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastic, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitance measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
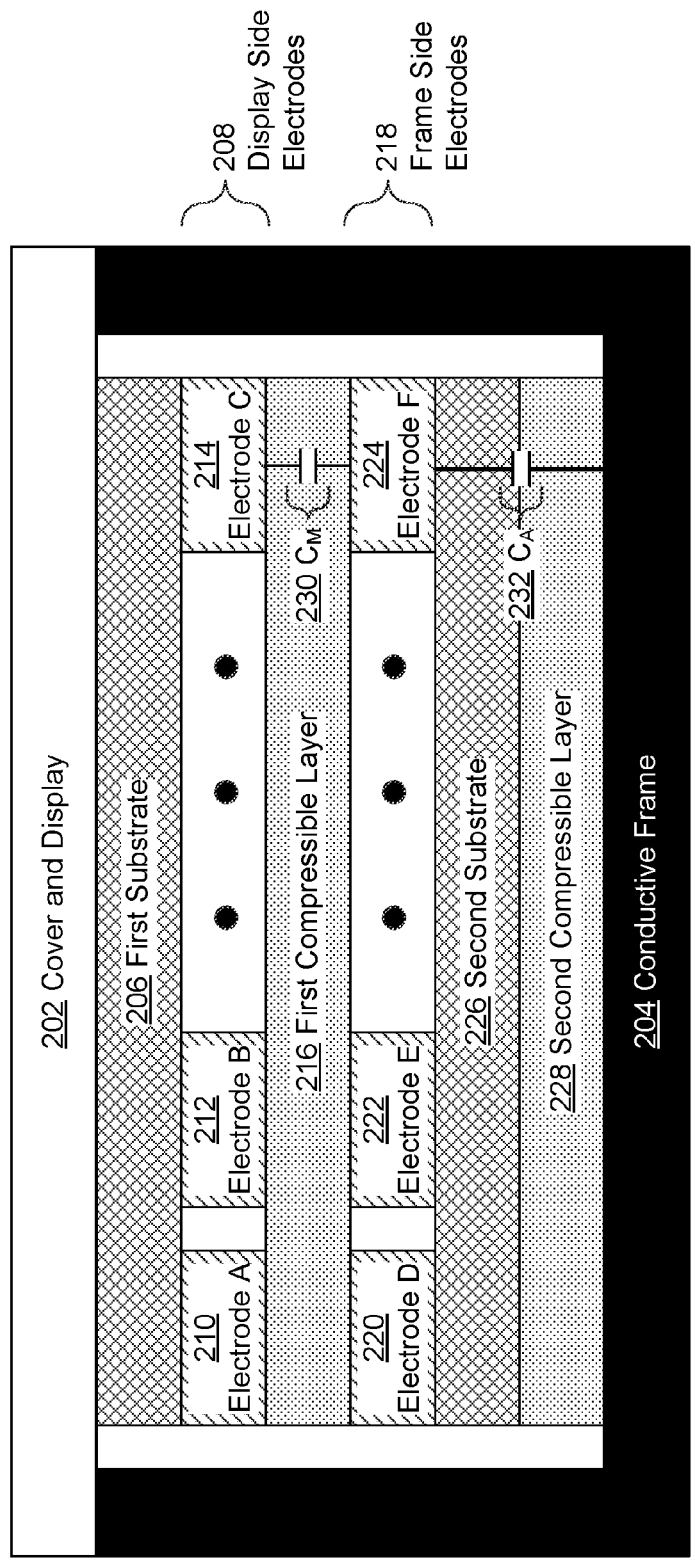

FIG. 2 shows a cross sectional diagram of an input device (200) in accordance with one or more embodiments of the invention. In particular, FIG. 2 shows an example stack-up of electrodes in the input device for sensing input objects and force on the sensing region. The diagram is not to scale. For example, the size and layout of electrodes may change without departing from the scope of the invention.

As shown in FIG. 2, a cover and display (202) form a top layer of the input device in accordance with one or more embodiments of the invention. The cover is a protective cover on the display. For example, the cover may be made of glass or other transparent material. The display includes electronics for presenting an interface.

The cover and display (202) are connected to a conductive frame (204) in accordance with one or more embodiments of the invention. The connection may use fasteners (not shown). In other words, the fasteners may connect one or both of the cover and display to the conductive frame at attachment points (not shown). For example, the fastener may be an adhesive (e.g., weld, solder, cement, glue), crimping, a mounting bracket or other hardware connector, or other type of fastener. The attachment points are the points at which the fastener connects the cover and display (202) to the conductive frame (204). For example, the attachment points may be around the edges of the input surface and/or the display. Other attachment points may exist without departing from the scope of the invention. The fastener may affect the bending properties of the cover and display. In other words, amount of bend may change depending on the type of fastener used and the location of the attachment points.

The conductive frame (204) is a physical structure of the input device that is made of conductive material. For example, the conductive frame (204) may be made of metal. The conductive frame may be a mid-frame or housing of the input device. A mid-frame is in a middle section of the input device that spans the input device and provides a support structure. The housing is a casing that encloses the input device to protect the input device.

Between the cover and display (202) and conductive frame (204) is a first substrate (206), one or more display side electrodes (208) (e.g., electrode A (210), electrode B (212), electrode C (214)), a first compressible layer (216), one or more frame side electrodes (218) (e.g., electrode D (220), electrode E (222), electrode F (224)), a second substrate (226), and a second compressible layer (228). Each of these components is discussed below.

The first compressible layer (216) and second compressible layer (228) is a layer that is configured to compress at least in a direction perpendicular to the surface of the cover and display (202). In other words, when a force is applied to the input surface (e.g., the cover), the force causes one or both of the compressible layers to compress. The amount of compression may vary across a compressible layer, and may be dependent on the bending properties of the cover and display (202). The compressible layers (e.g., first compressible layer (216) and second compressible layer (228)) may be made of foam, air, or other compressible material. The compressible layers (e.g., first compressible layer (216) and second compressible layer (228)) may be the same or different materials, may have holes, bubbles, various densities, or other features. Particularly if the compressible layers are made of different materials, the compressible layers may begin to compress at different times and by different amounts in response to a force being applied to the input surface.

As shown in FIG. 1, the first compressible layer is between display side electrodes (208) and the frame side electrodes (218). The display side electrodes (208) are the set of one or more electrodes (e.g., the electrodes discussed above with referenced to FIG. 1) that are closer to the cover and display (202) than the frame side electrodes (218). Conversely, the frame side electrodes (218) are the set of one or more electrodes (e.g., the electrodes discussed above with referenced to FIG. 1) that are closer to the conductive frame (204) than the display side electrodes (208). Thus, when the first compressible layer (216) compresses, the display side electrodes (208) move closer to the frame side electrodes (218). In one or more embodiments, the display side electrodes (208) and the frame side electrodes (218) are configured to perform mutual capacitance sensing. For example, the display side electrodes (208) may be transmitter electrodes that transmit sensing signals and the frame side electrodes (218) may be receiver electrodes that receive resulting signals that include the effects of the sensing signals. By way of another example, the frame side electrodes (218) may be transmitter electrodes that transmit sensing signals and the display side electrodes (208) may be receiver electrodes that receive resulting signals that include the effects of the sensing signals. As the display side electrodes (208) move closer to the frame side electrodes (218) (e.g., through compression of the first capacitance layer), the mutual capacitance (Cm (230)) between the display side electrodes (208) and the frame side electrodes (218) changes. One or more embodiments use the magnitude of the change to detect the force applied to the input surface.

The frame side electrodes (218) further include functionality to perform absolute capacitance sensing and measure the absolute capacitance (CA (232)). In other words, the frame side electrodes (218) are modulated with a sensing signal. As the second compressible layer compresses, the frame side electrodes (218) frame side electrodes (218) move closer to the conductive frame (204). The move toward the conductive frame (204) increases a parasitic capacitance to ground. In other words, the conductive frame (204) affects the measured absolute capacitance of the frame side electrodes (218). The conductive frame does not transmit or receive sensing signals.

In one or more embodiments, the first substrate (206) is configured to mount the display side electrodes (208). The second substrate (226) is configured to mount the frame side electrodes (226). Although FIG. 2 shows the electrodes on particular sides of the substrates, the electrodes may be on either or both side of the respective substrates.

While FIGS. 1 and 2 show a configuration of components, other configurations may be used without departing from the scope of the invention. For example, various components may be combined to create a single component. As another example, the functionality performed by a single component may be performed by two or more components. Below are various examples of different configurations in accordance with one or more embodiments. The different configurations are not exhaustive. Further, the various configurations disclosed herein may be combined in virtually any contemplated manner.

Further, although FIG. 2 shows a distinct display and display side electrodes, the display side electrodes may be the same electrodes as in the display. For example, one or more embodiments may use in-cell sensing, whereby the display includes the display side electrodes as a single layer. Thus, a first substrate, and separate display side electrodes and display may not exist. For example, components of the display may be used as transmitter electrodes obviating the need for the first substrate.

Further, the number, size, shape, and dimensions of electrodes may be different than those shown in FIG. 2. For example, although FIG. 2 shows each frame side electrode being opposite an individual corresponding display side electrode, a frame side electrode may be opposite of multiple display side electrodes (e.g., by having the frame side electrode be larger and/or be in a different direction than the display side electrodes). Conversely, a display side electrode may be opposite of multiple frame side electrodes. Additionally, any number of the display and frame side electrodes may be only partially vertically aligned, or not vertically aligned at all.

In one or more embodiments, the second compressible layer (228) is air gap. In such a scenario, one or more embodiments may be used to mitigate effects of manufacturing limitations of not being able to mount the frame side electrodes to the frame. In other words, when the frame side electrodes are not mounted to a conductive frame, an air gap may exist between the frame side electrodes and the conductive frame. One or more embodiments perform absolute capacitance sensing with the frame side electrodes to detect at least a portion of the force, whereby the portion only affect the absolute capacitance (232) and not the mutual capacitance (230). The force from the absolute capacitance measurement is aggregated with the force from the mutual capacitance measurement in order to determine total force. Thus, even when the existence of the second compressible layer is incidental to the manufacturing process, one or more embodiments may create a more accurate estimate of force on the input surface.

Figure 3:
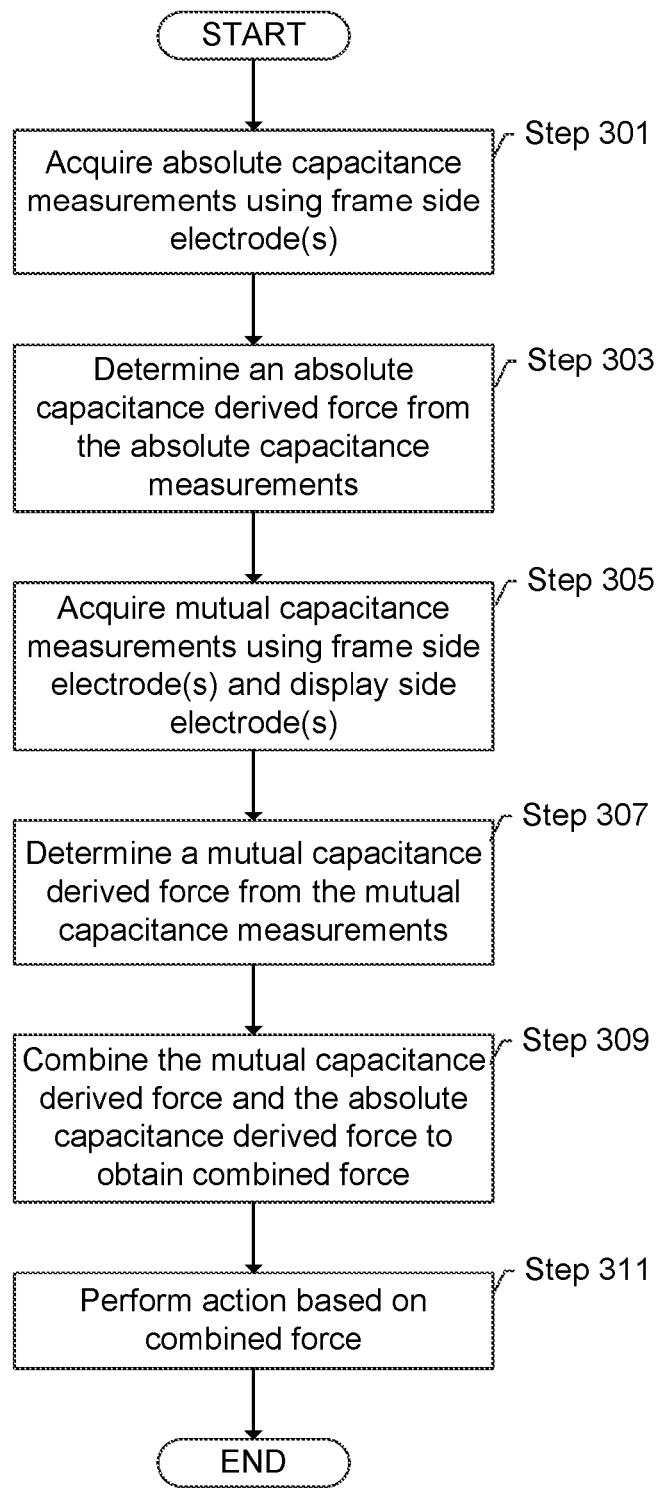
FIG. 3 shows a flowchart in accordance with one or more embodiments of the invention.

FIG. 3 shows a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 301, absolute capacitance measurement is acquired using at least one frame side electrode(s) in accordance with one or more embodiments of the invention. Absolute capacitance or self capacitance is determined by determining the amount of electric charge is added to the frame side electrode to increase the electric potential of the frame side electrode by one unit. To determine the absolute capacitance, the frame side electrodes are driven with a modulated sensing signal to determine the amount of electric charge. Measurements at each frame side electrode are obtained. For example, the measurements may be obtained at once or at different times.

In Step 303, an absolute capacitance derived force is obtained from the absolute capacitance measurements. The absolute capacitance derive force is the force determined from the absolute capacitance sensing. Because the conductive frame affects the absolute capacitance, as the distance to the conductive frame decreases, due to compression of the second compressible layer by force on the input surface, the greater the effect on the absolute capacitance measurements. In one or more embodiments, the raw measurements determined in Step 301 are processed to subtract a baseline and perform any other filtering. The filtered measurements may be compared against a bending model in order to determine a force for each location. Based on the bending model, the force may be determined.

In Step 305, mutual capacitance measurements are acquired using at least one frame side electrode and at least one display side electrode in accordance with one or more embodiments of the invention. Mutual capacitance measurements may be obtained by transmitting with a transmitter electrode (e.g., frame side electrode, display side electrode) a transmitter signal. Resulting signals are received using the other electrode, which is the receiver electrode (e.g., display side electrode, frame side electrode, respectively).

In Step 307, a mutual capacitance derived force is obtained from the mutual capacitance measurements. The mutual capacitance derive force is the force determined from the mutual capacitance sensing. The resulting signals may include effects of noise, which may be estimated and subtracted from the measurements. The resulting signals are also affected by the distance between the frame side electrode and the corresponding display side electrode. Thus, as the distance changes, the magnitude of the measurements changes and may be used to determine force. In other words, a delta image may be generated and compared against a bending model for the input device. The bending model provides a correlation between force, bending, and the measurements. Based on the comparison, mutual capacitance derived force is determined.

In Step 309, the mutual capacitance derived force and the absolute capacitance derived force are combined to obtain a combined force in accordance with one or more embodiments of the invention. For example, the combination may be summation of the two forces. Further, the summation may be performed per pixel, per input object, for the whole input device, or a different granularity. For example, if per input object, a separate mutual capacitance derived force and absolute capacitance derived force may exist for each input object. Thus, for each input object, the corresponding mutual capacitance derived force and corresponding absolute capacitance derived force, that correspond to the input object, are combined into a combined force for the input object. By way of another example, the measurements may be combined on a per capacitance pixel basis.

In Step 311, an action is performed based on the combined force in accordance with one or more embodiments of the invention. For example, the action may be to report the force to a host device. By way of another example, the action may be to change a graphical user interface on the display, perform a function on the input device to change a state of the input device, or perform any other operation based on the determined force.

The following example is for explanatory purposes only and not intended to limit the scope of the invention. FIGS. 4.1, 4.2, 4.3, and 4.4 show an example time series diagrams of an input device in accordance with one or more embodiments of the invention. The example is not to scale. In the example, consider the scenario in which an input object, such as a finger, presses on the cover and display of the input device. In the example, the input device includes a cover and display (400), a first substrate for mounting the display side electrodes (e.g., electrode 1 (404), electrode 2 (406)) and a second substrate (408) for mounting the frame side electrodes (e.g., electrode 3 (410), electrode 4 (412)). Between the display side electrodes and the frame side electrodes is a compressible layer made of foam (414). Between the frame side electrodes and the housing (416) is air gap (418). The example FIGS. 4.1, 4.2, 4.3, and 4.4 show the input device as the press is being performed.

FIG. 4.1 shows an example diagram at time T1 (420) in accordance with one or more embodiments of the invention. At time T1, the input object has contacted the sensing region and has only provided a negligible amount of force on the sensing region. The frame side electrodes measure an absolute capacitance of $C_{A1}$ (422). Further, mutual capacitance measurements are acquired between the display side electrodes and the frame side electrodes of $C_{M1}$ (424).

Continuing with the example, FIG. 4.2 shows an example diagram at time T2 (430) in accordance with one or more embodiments of the invention. At time T2, the input object has contacted the sensing region and is starting to press with a greater amount of force. The air gap (418) compresses causing the frame side electrodes to move closer to the housing (416). Thus, the frame side electrodes measure an absolute capacitance of $C_{A2}$ (432). However, because the foam does not yet compress based on lacking sufficient force, mutual capacitance measurements acquired between the display side electrodes and the frame side electrodes remain at $C_{M1}$ (424).

Continuing with the example, FIG. 4.3 shows an example diagram at time T3 (440) in accordance with one or more embodiments of the invention. At time T3, the input object is pressing with a greater amount of force than at time T2. The air gap (418) further compresses causing the frame side electrodes to move closer to the housing (416). Thus, the frame side electrodes measure an absolute capacitance of $C_{A3}$ (442). Further, the foam (414) compresses causing the display side electrodes to move closer to the frame side electrodes. Thus, mutual capacitance measurements acquired between the display side electrodes and the frame side electrodes are $C_{M2}$ (444).

Finally, in the example, FIG. 4.4 shows an example diagram at time T4 (450) in accordance with one or more embodiments of the invention. At time T4, the input object is pressing with a greater amount of force than at time T3. However, the air gap (418) has completely compressed, and thus, additional force is reflected in the compression of the foam. Thus, the frame side electrodes measure an absolute capacitance of $C_{A3}$ (442), similar to the example at time T3. Further, the foam (414) compresses more causing the display side electrodes to move closer to the frame side electrodes. Thus, mutual capacitance measurements acquired between the display side electrodes and the frame side electrodes are $C_{M3}$ (454).

At each time in the example, the force determine from the absolute capacitance measurements and the mutual capacitance measurements are aggregated to obtain a combined force. Thus, the combined force represents a more accurate estimate of the force on the input surface of the input device. As shown one or more embodiments provide a mechanism for an input device to detect force on an input surface, such as a cover and display. Thus, the input device may be more responsive to users based on implementing one or more embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for hybrid force sensing comprising:
   acquiring a plurality of absolute capacitance measurements of an absolute capacitance of at least one frame side electrode disposed between a conductive frame and at least one display side electrode,
      wherein the at least one display side electrode is disposed between a display and the at least one frame side electrode,
      wherein acquiring the plurality of absolute capacitance measurements comprises modulating the at least one frame side electrode with a reference voltage and measuring the absolute capacitance of the at least one frame side electrode, and
      wherein the absolute capacitance is based on a distance of the at least one frame side electrode to the conductive frame;
   acquiring a plurality of mutual capacitance measurements of a mutual capacitance between the at least one frame side electrode and the at least one display side electrode;
   determining an absolute capacitance derived force from the plurality of absolute capacitance measurements;
   determining a mutual capacitance derived force from the plurality of mutual capacitance measurements;
   combining the absolute capacitance derived force and the mutual capacitance derived force to obtain a combined force; and
   performing an action based on the combined force.

2. The method of claim 1, wherein combining the absolute capacitance derived force and the mutual capacitance derived force comprises totaling the absolute capacitance derived force and the mutual capacitance derived force.

3. The method of claim 1, wherein acquiring a plurality of mutual capacitance measurements comprises using the at least one frame side electrode as a transmitter electrode and the at least one display side electrode as a receiver electrode, wherein the transmitter electrode transmits sensing signals and the receiver electrode receives resulting signals based on the sensing signals.

4. The method of claim 1, wherein acquiring the plurality of mutual capacitance measurements comprises using the at least one frame side electrode as a receiver electrode and the at least one display side electrode as a transmitter electrode, wherein the transmitter electrode transmits sensing signals and the receiver electrode receives resulting signals based on the sensing signals.

5. An input device comprising:
   a display;
   a conductive frame;
   at least one frame side electrode;
   at least one display side electrode, wherein the at least one display side electrode is disposed between the display and the at least one frame side electrode, and wherein the at least one frame side electrode is disposed between the conductive frame and the at least one display side electrode;
   a first compressible layer, wherein the at least one display side electrode is interposed between the display and the first compressible layer; and
   a processing system that is configured to:
      acquire a plurality of absolute capacitance measurements of an absolute capacitance of at least one frame side electrode;
      acquire a plurality of mutual capacitance measurements of a mutual capacitance between the at least one frame side electrode and at least one display side electrode;
      determine an absolute capacitance derived force from the plurality of absolute capacitance measurements;
      determine a mutual capacitance derived force from the plurality of mutual capacitance measurements;
      combine the absolute capacitance derived force and the mutual capacitance derived force to obtain a combined force; and
      perform an action based on the combined force.

6. The input device of claim 5, wherein the first compressible layer is a foam.

7. The input device of claim 5, further comprising:
   a first substrate attached to the display,
   wherein the at least one display side electrode is interposed between the first substrate and the first compressible layer.

8. The input device of claim 5, further comprising:
   a second compressible layer,
   wherein the second compressible layer is interposed between the at least one frame side electrode and the conductive frame.

9. The input device of claim 5, wherein the conductive frame is a metal housing.

10. The input device of claim 5, wherein the conductive frame is a mid-frame of the input device.

11. The input device of claim 8, further comprising a second substrate mounting the at least one frame side electrode.

12. The input device of claim 8, wherein the second compressible layer is air.

13. The input device of claim 8, wherein the second compressible layer is foam.

14. The input device of claim 5, wherein the at least one display side electrode is comprised in the display.

15. A processing system for hybrid force sensing comprising:

sensor circuitry with functionality for:
   acquiring a plurality of absolute capacitance measurements of an absolute capacitance of at least one frame side electrode,
      wherein the at least one frame side electrode is disposed between a conductive frame and at least one display side electrode,
      wherein acquiring the plurality of absolute capacitance measurements comprises modulating the at least one frame side electrode with a reference voltage and measuring the absolute capacitance of the at least one frame side electrode, and
      wherein the absolute capacitance is based on a distance of the at least one frame side electrode to the conductive frame, and
   acquiring a plurality of mutual capacitance measurements of a mutual capacitance between the at least one frame side electrode and the at least one display side electrode, wherein the at least one display side electrode is disposed between a display and the at least one frame side electrode; and
processing circuitry with functionality for:
   determining an absolute capacitance derived force from the plurality of absolute capacitance measurements,
   determining a mutual capacitance derived force from the plurality of mutual capacitance measurements,
   combining the absolute capacitance derived force and the mutual capacitance derived force to obtain a combined force, and
   performing an action based on the combined force.

16. The processing system of claim 15, wherein combining the absolute capacitance derived force and the mutual capacitance derived force comprises totaling the absolute capacitance derived force and the mutual capacitance derived force.

17. The processing system of claim 15, wherein acquiring a plurality of mutual capacitance measurements comprises using the at least one frame side electrode as a transmitter electrode and the at least one display side electrode as a receiver electrode, wherein the transmitter electrode transmits sensing signals and the receiver electrode receives resulting signals based on the sensing signals.

18. The processing system of claim 15, wherein acquiring a plurality of mutual capacitance measurements comprises using the at least one frame side electrode as a receiver electrode and at least one display side electrode as a transmitter electrode, wherein the transmitter electrode transmits sensing signals and the receiver electrode receives resulting signals based on the sensing signals.

\* \* \* \* \*